United States Patent
Nishide

(10) Patent No.: US 9,322,403 B2
(45) Date of Patent: Apr. 26, 2016

(54) COMPRESSOR

(75) Inventor: Youhei Nishide, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/233,597

(22) PCT Filed: Jul. 10, 2012

(86) PCT No.: PCT/JP2012/004452
§ 371 (c)(1),
(2), (4) Date: Jan. 17, 2014

(87) PCT Pub. No.: WO2013/011658
PCT Pub. Date: Jan. 24, 2013

(65) Prior Publication Data
US 2014/0127057 A1    May 8, 2014

(30) Foreign Application Priority Data

Jul. 19, 2011  (JP) .................. 2011-158042

(51) Int. Cl.
*F01C 21/04* (2006.01)
*F04C 27/02* (2006.01)
(Continued)

(52) U.S. Cl.
CPC ........... *F04C 18/0215* (2013.01); *F04C 23/008* (2013.01); *F04C 27/009* (2013.01); *F04C 29/02* (2013.01); *F04C 29/023* (2013.01);
(Continued)

(58) Field of Classification Search
CPC .... F04C 18/0207; F04C 23/008; F04C 29/02; F04C 29/023; F04C 2240/60; F16C 2360/42
USPC ............ 418/55.1–55.6, 94, 98, 102; 417/372
See application file for complete search history.

(56) References Cited

U.S. PATENT DOCUMENTS 4,065,279 A * 12/1977 McCullough .................. 62/510
4,734,020 A *  3/1988 Inaba et al. ................. 418/55.6
(Continued)

FOREIGN PATENT DOCUMENTS

EP    2 267 310 A1   12/2010
JP    59-32691 A      2/1984
(Continued)

OTHER PUBLICATIONS

International Preliminary Report of corresponding PCT Application No. PCT/JP2012/004452.
(Continued)

*Primary Examiner* — Thai Ba Trieu
*Assistant Examiner* — Deming Wan
(74) *Attorney, Agent, or Firm* — Global IP Counselors

(57) ABSTRACT

A compressor includes a compression mechanism, a drive shaft, a bearing, and an oil supply passage configured to supply lubrication oil to a clearance between the drive shaft and the bearing. The drive shaft includes a large-diameter shaft part supported by the bearing, and a small-diameter shaft part connected to a lower end part of the large-diameter shaft part. A sealing part is configured to reduced or prevent oil leakage from the bearing includes an oil receiving surface formed in the bearing housing so as to face a stepped surface formed at a boundary between the large-diameter shaft part and the small-diameter shaft part. A clearance is formed between the oil receiving surface and the stepped surface so as to surround an outer periphery of the small-diameter shaft part.

18 Claims, 5 Drawing Sheets

(51) Int. Cl.
  F04C 29/02    (2006.01)
  F01C 1/063    (2006.01)
  F04B 39/02    (2006.01)
  F04C 18/02    (2006.01)
  F04C 23/00    (2006.01)
  F16C 33/74    (2006.01)
  F16C 33/10    (2006.01)
  F04C 27/00    (2006.01)

(52) U.S. Cl.
  CPC ............. *F16C33/103* (2013.01); *F16C 33/74* (2013.01); *F04C 2240/54* (2013.01); *F04C 2240/56* (2013.01); *F04C 2240/60* (2013.01); *F16C 2360/42* (2013.01)

(56) References Cited

U.S. PATENT DOCUMENTS

| | | | |
|---|---|---|---|
| 5,133,651 A | | 7/1992 | Onoda et al. |
| 5,551,852 A | * | 9/1996 | Saito et al. .................. 418/98 |
| 5,593,297 A | | 1/1997 | Nakajima et al. |
| 6,024,548 A | * | 2/2000 | Bushnell ..................... 418/94 |
| 6,158,980 A | * | 12/2000 | Tsumagari et al. ........... 417/366 |
| 7,112,046 B2 | * | 9/2006 | Kammhoff et al. .......... 418/55.1 |
| 2010/0329914 A1 | * | 12/2010 | Yamada et al. .............. 418/55.6 |

FOREIGN PATENT DOCUMENTS

| | | |
|---|---|---|
| JP | 10-153186 A | 6/1998 |
| JP | 11-22669 A | 1/1999 |
| JP | 2001-107862 A | 4/2001 |
| JP | 2003-129967 A | 5/2003 |
| JP | 2003-184774 A | 7/2003 |
| JP | 2003-294037 A | 10/2003 |
| JP | 2009-228676 A | 10/2009 |

OTHER PUBLICATIONS

International Search Report of corresponding PCT Application No. PCT/JP2012/004452.
European Search Report of corresponding EP Application No. 12 81 5257.6 dated Jan. 30, 2015.

* cited by examiner

COMPRESSOR

CROSS-REFERENCE TO RELATED APPLICATIONS

This U.S. National stage application claims priority under 35 U.S.C. §119(a) to Japanese Patent Application No. 2011-158042, filed in Japan on Jul. 19, 2011, the entire contents of which are hereby incorporated herein by reference.

TECHNICAL FIELD

The present disclosure relates to a compressor including a compression mechanism configured to compress fluid by rotational movement, a rotary drive shaft configured to drive the compression mechanism, a bearing through which the rotary drive shaft penetrates, and an oil supply passage formed in the rotary drive shaft to supply lubrication oil to a clearance between the rotary drive shaft and the bearing.

BACKGROUND ART

Conventionally, scroll compressors have been known as compressors configured to compress fluid (see, e.g., Japanese Unexamined Patent Publication No. 2003-294037). The scroll compressor includes, as a compression mechanism, a fixed scroll and a movable scroll. The movable scroll is placed on an upper surface of a frame member with an Oldham's coupling being interposed between the movable scroll and the frame member, and is rotatably driven by a drive shaft connected to a rear surface of the movable scroll. The drive shaft is fixed so as to be inserted into a rotor of a drive motor, and is rotatably supported by upper and lower bearings which are stacked on each other with the motor being interposed therebetween. An oil supply passage is formed in the drive shaft, and an oil pump connected to a lower end part of the drive shaft supplies lubrication oil from the oil supply passage to a clearance between an inner circumferential surface of each bearing and an outer circumferential surface of the drive shaft. An oil groove extending in a circumferential direction and serving as an oil collector is formed on a lower side in part of the outer circumferential surface of the drive shaft supported by the upper bearing. In the upper bearing, an oil passage through which lubrication oil collected to the oil groove is guided to a predetermined section is formed. This prevents oil from leaking down from the bearing.

SUMMARY

Technical Problem

In the foregoing scroll compressor, when the rotation speed of the motor is increased in order to increase, e.g., the circulation amount of fluid, the rotation speed of the oil pump is increased in proportion to the rotation speed of the motor, and the amount of lubrication oil supplied from the oil pump to each bearing is also increased. Thus, when the scroll compressor is operated at a high rotation speed, the amount of lubrication oil supplied from the oil pump to the bearing exceeds the amount of lubrication oil which can be collected to the oil groove, and therefore lubrication oil is likely to leak from a lower end of the bearing. As a result, there is a disadvantage that oil leaking from the lower end of the upper bearing flows, together with refrigerant (fluid), out from the casing through an outlet pipe.

The present disclosure has been made in view of the foregoing, and aims to prevent lubrication oil supplied to a bearing from leaking from a lower end of the bearing and flowing out from a casing.

Solution to the Problem

A first aspect of the invention is intended for a compressor including a casing (5); a compression mechanism (7) housed in the casing (5) and configured to compress fluid by rotational movement; a rotary drive shaft (11) housed in the casing (5) and connected to the compression mechanism (7) at an upper end part of the rotary drive shaft (11); a bearing (3) through which the rotary drive shaft (11) penetrates; an oil supply passage (29) formed in the rotary drive shaft (11) to supply lubrication oil to a clearance between the rotary drive shaft (11) and the bearing (3); and a sealing part (10) configured to reduce or prevent downward oil leakage from the bearing (3).

The rotary drive shaft (11) includes a large-diameter shaft part (11f) supported by the bearing (3), and a small-diameter shaft part (11g) formed so as to be coaxial to the large-diameter shaft part (11f) and connected to a lower end part of the large-diameter shaft part (11f).

The sealing part (10) includes an oil receiving surface (26) which faces a stepped surface (12) formed at a boundary between the large-diameter shaft part (11f) and the small-diameter shaft part (11g) with a clearance being formed between the oil receiving surface (26) and the stepped surface (12) and which is formed so as to surround an outer periphery of the small-diameter shaft part (11g).

In the first aspect of the invention, lubrication oil supplied to the clearance between the large-diameter shaft part (11f) of the rotary drive shaft (11) and the bearing (3) is branched into a flow toward an upper end side of the bearing (3) and a flow toward a lower end side of the bearing (3). The lubrication oil flowing toward the lower end side of the bearing (3) is received by the oil receiving surface (26) forming the sealing part (10), and flows into the clearance space (28) between the oil receiving surface (26) and the stepped surface (12) of the rotary drive shaft (11) formed at the boundary between the small-diameter shaft part (11g) and the large-diameter shaft part (11f). Since rotation centrifugal force of the rotary drive shaft (11) acts, through the stepped surface (12), on the lubrication oil flowing into the clearance space (28), the lubrication oil flowing into the clearance space (28) is pushed back to the outside in a radial direction by the centrifugal force. Thus, even if lubrication oil leaks from a seal clearance (90) formed on an inner circumferential side relative to the oil receiving surface (26), the amount of lubrication oil leakage can be suppressed to an extremely-small amount.

Moreover, in the present disclosure, the small-diameter shaft part (11g) is provided in the rotary drive shaft (11), and the oil receiving surface (26) is formed so as to surround the outer periphery of the small-diameter shaft part (11g). Thus, the cross-sectional area of a passage of the seal clearance (90) formed on the inner circumferential side relative to the oil receiving surface (26) can be reduced as compared to the case where no small-diameter shaft part (11g) is provided. As a result, downward oil leakage from the bearing (3) can be reduced as much as possible, A second aspect of the invention is intended for the compressor of the first aspect of the invention, which further includes a bearing housing (17) formed with an insertion hole (18) into which the bearing (3) is inserted and fixed to the casing (5). A first oil return groove (16) communicating, at one end thereof with a clearance space (28) between the stepped surface (12) and the oil receiving surface (26) and communicating, at the other end thereof, with a predetermined space (22) inside the casing (5) is formed at an inner circumferential surface of the bearing housing (17) defining the insertion hole (18) for the bearing (3).

In the second aspect of the invention, lubrication oil flowing into the clearance space (28) can be guided to the predetermined space (22) inside the casing (5) through the first oil return groove (16).

A third aspect of the invention is intended for the compressor of the first or second aspect of the invention, in which a slit-shaped groove (12a) extending from an inside to an outside in a radial direction of the rotary drive shaft (11) is formed at the stepped surface (12) of the rotary drive shaft (11).

In the third aspect of the invention, the slit-shaped groove (12a) is radially formed at the stepped surface (12) of the rotary drive shaft (11). Thus, as compared to the case where no slit-shaped groove (12a) is provided, it can be ensured that rotation centrifugal force from the rotary drive shaft (11) is transmitted to lubrication oil flowing into the clearance space (28). As a result, it can be ensured that the lubrication oil flowing into the clearance space (28) is pushed back to the outside in the radial direction.

A fourth aspect of the invention is intended for the compressor of any one of the first to third aspects of the invention, in which a second oil return groove (20) communicating, at one end thereof, with the clearance space (28) between the stepped surface (12) and the oil receiving surface (26) and communicating, at the other end thereof, with the predetermined space (22) inside the casing (5) is formed at an outer circumferential surface of the large-diameter shaft part (11f).

In the fourth aspect of the invention, lubrication oil flowing into the clearance space (28) can be guided to the predetermined space (22) inside the casing (5) through the second oil return groove (20).

A fifth aspect of the invention is intended for the compressor of the fourth aspect of the invention, in which the second oil return groove (20) formed in the large-diameter shaft part (11f) of the rotary drive shaft (11) extends from a lower end to an upper end of the large-diameter shaft part (11f) so as to be inclined toward a rear side in a rotation direction of the rotary drive shaft (11).

In the fifth aspect of the invention, since the second oil return groove (20) extends from the lower end to the upper end of the large-diameter shaft part (11f) so as to be inclined toward the rear side in the rotation direction of the rotary drive shaft (11), pumping action using viscous force upwardly transmitted in an inclination direction of the second oil return groove (20) can be provided for lubrication oil guided into the second oil return groove (20). This causes lubrication oil in the second oil return groove (20) to flow upward as the rotary drive shaft (11) rotates. Thus, as compared to, e.g., the case where the second oil return groove (20) is formed along an axial direction of the rotary drive shaft (11), it earl be ensured that lubrication oil flowing into the clearance space (28) is guided to the predetermined space (22) through the second oil return groove (20).

A sixth aspect of the invention is intended for the compressor of any one of the first to fifth aspects of the invention, in which the sealing part (10) further includes a cylindrical sealing surface (24a) extending downward from an inner circumferential edge of the oil receiving surface (26).

In the sixth aspect of the invention, since the seal clearance (90) between the cylindrical sealing surface (24a) and an outer circumferential surface of the small-diameter shaft part (11g) functions as a flow disturbing passage for reducing or preventing a downward flow of lubrication oil, downward leakage of lubrication oil from the bearing (3) can be reduced as much as possible.

A seventh aspect of the invention is intended for the compressor of the sixth aspect of the invention, in which a distance between an outer circumferential surface of the small-diameter shaft part (11g) and the cylindrical sealing surface (24a) is equal to or longer than a distance between the outer circumferential surface of the large-diameter shaft part (11f) and an inner circumferential surface of the bearing (3).

In the seventh aspect of the invention, the distance (i.e., the width of the seal clearance (90)) between outer circumferential surface of the small-diameter shaft part (11g) and the cylindrical sealing surface (24a) is set so as to be equal to or longer than the distance (i.e., a so-called bearing clearing) between the outer circumferential surface of the large-diameter shaft part. (11f) and the inner circumferential surface of the bearing (3). Thus, even if the rotary drive shaft (11) is decentered or inclined by the amount corresponding to the bearing clearance during rotation of the rotary drive shaft (11), the small-diameter shaft part (11g) and the cylindrical sealing surface (24a) do not contact with each other.

Advantages of the Invention

In the present disclosure, lubrication oil supplied to the clearance between the rotary drive shaft (11) and the bearing (3) and flowing toward the lower end side of the bearing (3) can be received by the oil receiving surface (26) forming the sealing part (10). This allows centrifugal force to act on the received lubrication oil through the stepped surface (12) of the rotary drive shaft (11). Thus, downward leakage of lubrication front the seal clearance (90) formed on the inner circumferential side relative to the oil receiving surface (26) can be reduced. Moreover, since the oil receiving surface (26) is formed so as to surround the outer periphery of the small-diameter shaft part (11g) of the rotary drive shaft (11), the cross-sectional area of the passage of the seal clearance (90) formed on the inner circumferential side relative to the oil receiving surface (26) can be reduced as much as possible. Thus, even if lubrication oil leaks from the seal clearance (90), the amount of such leakage can be suppressed to an extremely-small amount. Furthermore, the following can be reduced: lubrication oil leaking down from the bearing (3) flows out from the casing (5) together with working fluid such as refrigerant. As a result, unwanted oil discharge resulting in a lack of a lubrication oil amount inside the casing (5) can be reduced or prevented.

In the second aspect of the invention, lubrication oil flowing into the clearance space (28) can be guided to the predetermined space (22) inside the casing (5) through the first oil return groove (16) formed at the inner circumferential surface of the bearing housing (17) defining the insertion hole (18) for the bearing (3). This reduces or prevents oil leakage caused due to accumulation of lubrication oil in the clearance space (28).

In the third aspect of the invention, since the slit-shaped groove (12a) is radially formed at the stepped surface (12) of the rotary drive shaft (11), it can be ensured that centrifugal force from the rotary drive shaft (11) is, through the slit-shaped groove (12a), transmitted to lubrication oil flowing into the clearance space (28). Thus, even in, e.g., the case where the rotational speed of the compressor increases to rapidly increase the amount of lubrication oil supplied to the bearing (3), the lubrication oil can be, against inertia of a flow of the lubrication oil, pushed back to the outside of the clearance space (28) in the radial direction.

In the fourth aspect of the invention, lubrication oil flowing into the clearance space (28) can be guided to the predetermined space (22) inside the casing (5) through the second oil return groove (20). Thus, advantages similar to those of the second aspect of the invention can be realized.

In the fifth aspect of the invention, the second oil return groove (20) is inclined to the rear side in the rotation direction of the rotary drive shaft (11) as the second oil return groove (20) extends upward. This allows inertia force upwardly transmitted in the inclination direction of the second oil return groove (20) to act on lubrication oil in the second oil return groove (20). As a result, the second oil return groove (20) functions as a pump configured to pump up lubrication oil from the clearance space (28). Thus, it can be ensured that lubrication oil which cannot be discharged from the clearance space (28) only by rotation centrifugal force of the rotary drive shaft (11) is guided to the predetermined space (22) by the pumping action of the second oil return groove (20).

In the sixth aspect of the invention, the seal clearance (90) between the cylindrical sealing surface (24a) and the outer circumferential surface of the small-diameter shaft part (11g) is used as the flow disturbing passage, downward leakage of lubrication oil from the bearing (3) can be reduced as much as possible.

In the seventh aspect of the invention, even if the rotary drive shaft (11) is decentered or inclined by the amount corresponding to the bearing clearance during operation of the compressor, the small-diameter shaft part (11g) and the cylindrical sealing surface (24a) do not contact with each other. Thus, an adverse influence such as seizure due to contact between the small-diameter shaft part (11g) and the cylindrical sealing surface (24a) can be reduced or prevented. Considering reduction or prevention of seizure of the rotary drive shaft (11), it is generally preferred that the distance (i.e., the seal clearance (90)) between the outer circumferential surface of the small-diameter shaft part (11g) and the cylindrical sealing surface (24a) is long. Considering reduction or prevention of oil leakage, it is preferred that the distance between the outer circumferential surface of the small-diameter shaft part (11g) and the cylindrical sealing surface (24a) is short. Thus, in a conventional compressor, it is difficult to realize both of reduction or prevention of seizure of the rotary drive shaft (11) and reduction or prevention of oil leakage. On the other hand, in the present disclosure, rotation centrifugal force of the rotary drive shaft (11) is used to intentionally discharge lubrication oil between the oil receiving surface (26) and the stepped surface (12) of the rotary drive shaft (11) to the outside in the radial direction. Thus, even if a large seal clearance (90) on the inner circumferential side relative to the oil receiving surface (26) is formed, leakage of lubrication oil from the seal clearance (90) can be reduced. Consequently, the foregoing demands conflicting with each other can be fulfilled.

DESCRIPTION OF EMBODIMENTS

Embodiments of the present disclosure will be described below in detail with reference to drawings.

First Embodiment

Figure 1:
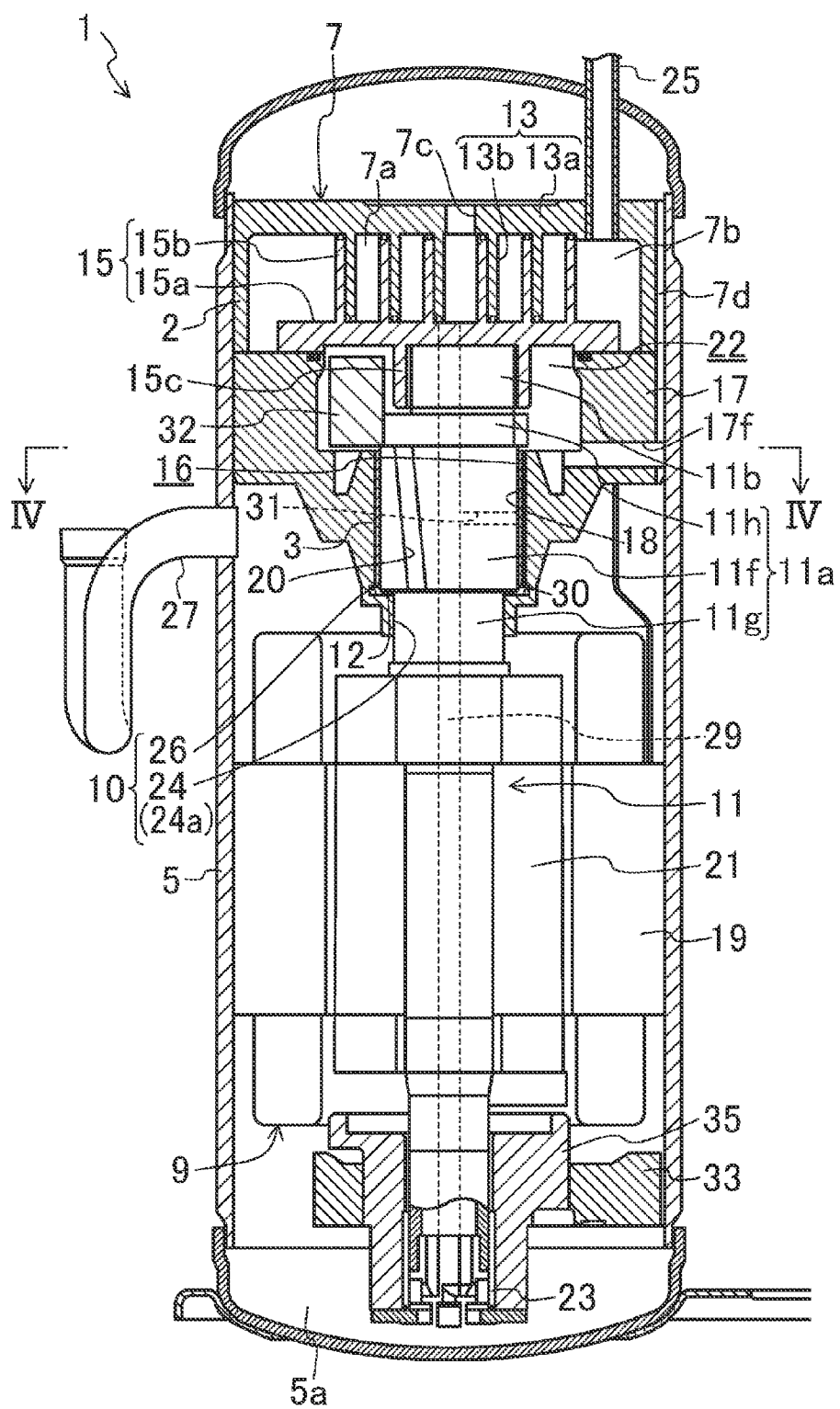
FIG. 1 is a longitudinal sectional view illustrating a compressor of an embodiment of the present disclosure.

FIG. 1 illustrates a scroll compressor (1) of a first embodiment of the present disclosure. The scroll compressor (1) is provided in, e.g., a vapor compression refrigeration circuit of an air conditioner, and is configured to compress refrigerant.

The scroll compressor (1) includes a casing (5), a scroll mechanism (7) housed in the casing , and a motor (9) housed in the casing (5). The scroll mechanism (7) and the motor (9) are connected together through a drive shaft (11), The drive shaft (11) is rotatably supported by an upper bearing (3) and a lower bearing (35) which are staked on each other with the motor (9) being interposed therebetween.

The scroll mechanism (7) includes a fixed scroll (13) and a movable scroll (15), and serves as a compression mechanism.

The fixed scroll (13) and the movable scroll (15) are each configured such that a spiral wrap (13b, 15b) is formed together with a flat plate-shaped board (13a, 15a). The fixed scroll (13) and the movable scroll (15) are arranged in parallel such that the wraps (13b, 15b) are engaged with each other to form a compression chamber (7a).

The board (13a) of the fixed scroll (13) is, at an outer circumferential part thereof, fixed to an upper surface of a housing (17).

The housing (17) is, at an outer circumferential part thereof, fixed to the casing (5), and the drive shaft (11) penetrates a center part of the housing (17). On the upper surface of the housing (17), the movable scroll (15) is placed so as not to rotate but to revolve with an Oldham's coupling (not shown in the figure) being interposed between the movable scroll (15) and the housing (17).

The motor (9) serves as a drive unit including a stator (19) and a rotor (21), and is connected to the drive shaft (11) with the drive shaft (11) being inserted into the rotor (21).

An upper end of the drive shaft (11) is connected to the movable scroll (15) with the drive shaft (11) being inserted into a boss (15c) of the movable scroll (15). An oil pump (23) is provided in a lower end part of the drive shaft (11), and the oil pump (23) extends to the inside of an oil sump (5a) of a bottom part of the casing (5).

An inlet pipe (25) is connected to an upper part of the casing (5), and an outlet pipe (27) is connected to a middle part of a body of the casing (5). The inlet pipe (25) communicates with an intake space (7b) formed outside the wraps (13b, 15b), and refrigerant is introduced into the compression chamber (7a).

An outlet port (7c) communicating with the compression chamber (7a) is formed in a center part of the board (13a) of the fixed scroll (13). Moreover, a refrigerant passage (7d) is formed between an outer circumferential part of the board (13a) of the fixed scroll (13) and the casing (5) and between the outer circumferential part of the housing (17) and the casing (5). The refrigerant passage (7d) is formed on as to extend in a longitudinal direction, and guides refrigerant from above the fixed scroll (13) to below the housing (17).

An oil supply passage (29) is formed in the drive shaft (11). The oil supply passage (29) is formed so as to extend from a lower end to the upper end of the drive shaft (11), and communicates with the oil pump (23) at a lower end of the oil supply passage (29).

The drive shaft (11) includes a main shaft part (11a) fitted into the rotor (21) and rotatably fixed to the rotor (21), and a crank shaft part (11b) inserted into the boss (15c) formed at a lower surface of the movable scroll (15).

An upper end part of the main shaft part (11a) is, using the upper bearing (3), supported by the casing (5) with the housing (17) being interposed between the upper bearing (3) and the casing (5), and a lower end part of the main shaft part (11a) is, using the lower bearing (35), supported by the casing (5) with a support member (33) being interposed between the lower bearing (35) and the casing (5).

Part of the main shaft part (11a) above the motor (9) includes a large-diameter shaft part (11f) supported using the upper bearing (3), and a small-diameter shaft part (11g) formed so as to be coaxial to the large-diameter shaft part (11f) and connected to a lower end surface of the large-diameter shaft part (11f). A stepped surface (12) perpendicular to an axial direction of the main shaft part (11a) is formed at a boundary between the large-diameter shaft part (11f) and the small-diameter shaft part (11g) of the main shaft part (11a) (see FIGS. 2 and 3). The stepped surface (12) is part of the lower end surface of the large-diameter shaft part (11f) other than part of the large-diameter shaft part (11f) connected to the small-diameter shaft part (11g), and is formed in a circular shape surrounding the outer periphery of the small-diameter shaft part (11g) as viewed in the axial direction. A second oil return groove (20) which will be described later is formed at an outer circumferential surface of the large-diameter shaft part (11f) of the main shaft part (11a).

A weight press-fitted part (11h) having a diameter slightly smaller than that of the large-diameter shaft part (11f) is formed in part of the main shaft part (11a) above the large-diameter shaft part (11f). A balance weight (32) configured to correct rotation unbalance of the drive shaft (11) due to eccentricity of the crank shaft part (11b) is attached to the weight press-fitted part (11h).

The upper bearing (3) is a cylindrical plain bearing through which the drive shaft (11) penetrates, and is configured to receive lubrication oil supplied from the oil supply passage (29) through a branched passage (31) and support the drive shaft (11). The branched passage (31) opens at the outer circumferential surface of the drive shaft (11) so as to be positioned in the middle of the upper bearing (3) in the longitudinal direction. As in the upper bearing (3), the lower bearing (35) is also a cylindrical plain bearing.

The upper bearing (3) is, by press-fitting, fixed in a cylindrical bearing hole (18) formed in the center part of the housing (17). Note that the outlet pipe (27) is connected to the casing (5) at a position substantially lateral to the upper bearing (3). A first oil return groove (16) extending in the longitudinal direction is formed along an inner circumferential surface of the housing (17) defining the bearing hole (18). Note that the first oil return groove (16) is not limited to a single groove, and, e.g., a plurality of first oil return grooves (16) may be formed at equal intervals in a circumferential direction.

A recessed space (22) opening upward is formed above the bearing hole (18) of the housing (17), and the balance weight (32) is housed in the recessed space (22). A cylindrical seal hole (24) through which the small-diameter shaft part (11g) penetrates is formed at the bottom of the bearing hole (18). The seal hole (24) is formed so as to be coaxial to the bearing hole (18). A circular surface of the housing (17) which does not define the seal hole (24) at the bottom of the bearing hole (18) functions as an oil receiving surface (26) configured to receive lubrication oil flowing downward from the upper bearing (3).

In the present embodiment, the distance between a circumferential wall surface (24a) of the housing (17) defining the seal hole (24) and an outer circumferential surface of the small-diameter shaft part (11g) is set to be equal to or slightly longer than a bearing clearance of the upper bearing (3).

The oil receiving surface (26) is formed on as to face the circular stepped surface (12) formed in the upper end part of the main shaft part (11a) and to be apart from the stepped surface (12) with a predetermined clearance (i.e., formed so as to face the stepped surface (12) in the axial direction), and is formed an as to surround the outer periphery of the small-diameter shaft part (11g). In the present embodiment, the oil receiving surface (26) and the circumferential wall surface (24a) defining the seal hole (24) together form a sealing part (10). On a lower side of the bearing hole (18), a circular groove (30) is formed so as to surround the entire outer periphery of a clearance space (28) formed between the oil receiving surface (26) and the stepped surface (12). The circular groove (30) communicates with the clearance space (28) on an inner circumferential side of the circular groove (30). The circular groove (30) functions as a grinding undercut upon processing of the bearing hole (18), and also functions as a communication path between the clearance space (28) and the first oil return groove (16).

At a lower end of the first oil return groove (16), the first oil return groove (16) communicates with the circular groove (30). At an upper end of the first oil return groove (16), the first oil return groove (16) communicates with the recessed space (22) in which the balance weight is housed.

Figure 4:
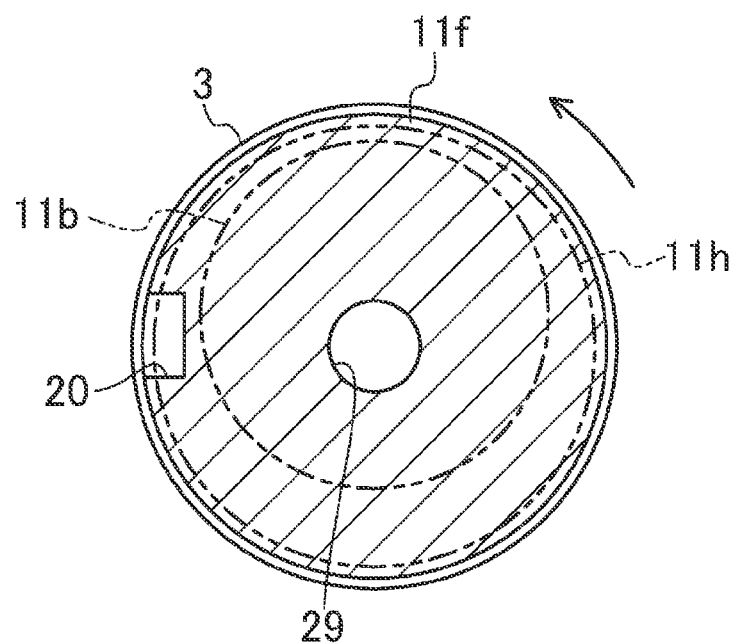
FIG. 4 is a cross-sectional view along an IV-IV line illustrated in FIG. 1.

Referring to FIG. 4, the second oil return groove (20) is formed at part of the outer circumferential surface of the large-diameter shaft part (11f) of the drive shaft (11) opposite to a load side. The second oil return groove (20) extends from a lower end side to an upper end side of the large-diameter shaft part (11f) an as to be inclined toward a rear side in a rotation direction of the large-diameter shaft part (11f) (i.e., inclined to a direction opposite to the rotation direction). At a lower end of the second oil return groove (20), the second oil return groove (20) communicates with the clearance space (28). At an upper end of the second oil return groove (20), the second oil return groove (20) communicates with the recessed space (22).

Operation

Next, a compression operation of the scroll a compressor (1) described above will be described.

First, when the motor (9) is driven, the movable scroll (15) dose not rotate but revolves relative to the fixed scroll (13) through the drive shaft (11). As the compression chamber (7a) formed between the wraps (13b, 15b) inwardly moves toward the center in a spiral pattern, the volume of the compression chamber (7a) decreases. Meanwhile, refrigerant in a refrigerant circuit flows into the intake space (7b) through the inlet pipe (25), and then flows into the compression chamber (7a) of the scroll mechanism (7). The refrigerant of the compression chamber (7a) is compressed as the volume of the compression chamber (7a) decreases, and flows into the casing (5) through the outlet port (7c). Such high-pressure refrigerant flows down from the upper part of the casing (5) through the refrigerant passage (7d). Then, the refrigerant flows into the refrigerant circuit through the outlet pipe (27).

Lubrication oil in the oil sump (5a) of a lower part of the casing (5) flows into the oil supply passage (29) by the oil pump (23), and then is supplied to, e.g., the upper bearing (3). In the upper bearing (3), the lubrication oil is supplied to a clearance between the outer circumferential surface of the large-diameter shaft part (11f) of the drive shaft (11) and an inner circumferential surface of the upper bearing (3) through the branched passage (31). The lubrication oil supplied to the clearance between the large-diameter shaft part (11f) and the upper bearing (3) is branched into a flow toward an upper end side of the upper bearing (3) and a flow toward a lower end side of the upper bearing (3). The lubrication oil flowing toward the lower end side of the upper bearing (3) is received by the oil receiving surface (26) of the housing (17), and flows into the clearance space (28) between the oil receiving surface (26) and the stepped surface (12) of the drive shaft (11). Rotation centrifugal force from the large-diameter shaft part (11f) acts, through the stepped surface (12), on the lubrication oil flowing into the clearance space (28). As a result, the lubrication oil flowing into the clearance space (28) is, by the centrifugal force, pushed back to the outside in a radial direction. The pushed-back lubrication oil is discharged to the circular groove (30) surrounding the clearance space (28), and is guided to the recessed space (22) through the first oil return groove (16) formed at the circumferential wall surface defining the bearing hole (18). The lubrication oil guided to the recessed space (22) flows into the refrigerant passage (7d) through an oil passage (17f) formed in the housing (17). Then, the lubrication oil flows downward together with refrigerant, and returns to the oil sump (5a).

Of the lubrication oil flowing into the clearance space (28), the lubrication oil which cannot be discharged to the circular groove (30) is discharged to the recessed space (22) through the second oil return groove (20). Since the second oil return groove (20) extends from the lower end side to the upper end side of the large-diameter shaft part (11f) so as to be inclined to the rear side in the rotation direction of the large-diameter shaft part (11f), the lubrication oil flowing into the second oil return groove (20) receives inertia force upwardly transmitted in an inclination direction of the second oil return groove (20) by rotation of the drive shaft (11). Thus, such inertia force is used to intentionally cause the lubrication oil in the second oil return groove (20) to upwardly flow, thereby guiding the lubrication oil to the recessed space (22).

Since the lubrication oil flowing into the clearance space (28) is guided to the recessed space (22) through the first oil return groove (16) or the second oil return groove (20), leakage of the lubrication oil from a seal clearance (90) between the seal hole (24) of the housing (17) and the drive shaft (11) toward the motor (9) can be reduced. Thus, since the amount of lubrication oil discharged through the outlet pipe (27) together with refrigerant decreases, unwanted oil discharge resulting in a lack of lubrication oil in the casing can be reduced or prevented.

In the foregoing embodiment, the distance (i.e., the width of the seal clearance (90)) between the circumferential wall surface (24a) defining the seal hole (24) and the outer circumferential surface of the small-diameter shaft part (11g) is set to be equal to or slightly longer than the bearing clearance of the upper bearing (3). Thus, even if the drive shaft (11) is decentered or inclined by the amount corresponding to the bearing clearance during operation of the scroll compressor (1), the small-diameter shaft part (11g) and the circumferential wall surface (24a) defining the seal hole (24) do not contact with each other. Consequently, an adverse influence such as seizure due to direct contact between the small-diameter shaft part (11g) and the circumferential wall surface (24a) can be reduced or prevented. Considering reduction or prevention of seizure of the drive shaft (11), it is generally preferred that the distance between the circumferential wall surface (24a) defining the seal hole (24) and the outer circumferential surface of the small-diameter shaft part (11g) is long. Considering reduction or prevention of oil leakage, it is preferred that the distance between the circumferential wall surface (24a) defining the seal hole (24) and the outer circumferential surface of the small-diameter shaft part (11g) is short. Thus, in a conventional compressor, it is difficult to realize both of reduction or prevention of seizure of a rotary drive shaft and reduction or prevention of oil leakage. In the foregoing embodiment, rotation centrifugal force of the drive shaft (11) is used to intentionally discharge lubrication oil between the oil receiving surface (26) and the stepped surface (12) of the drive shaft (11) to the outside in the radial direction. Thus, even if the large seal clearance (90) on the inner circumferential side relative to the oil receiving surface (26) is formed, leakage of lubrication oil from the seal clearance (90) can be reduced. Consequently, the foregoing demands conflicting with each other can be fulfilled.

Variation

Figure 2:
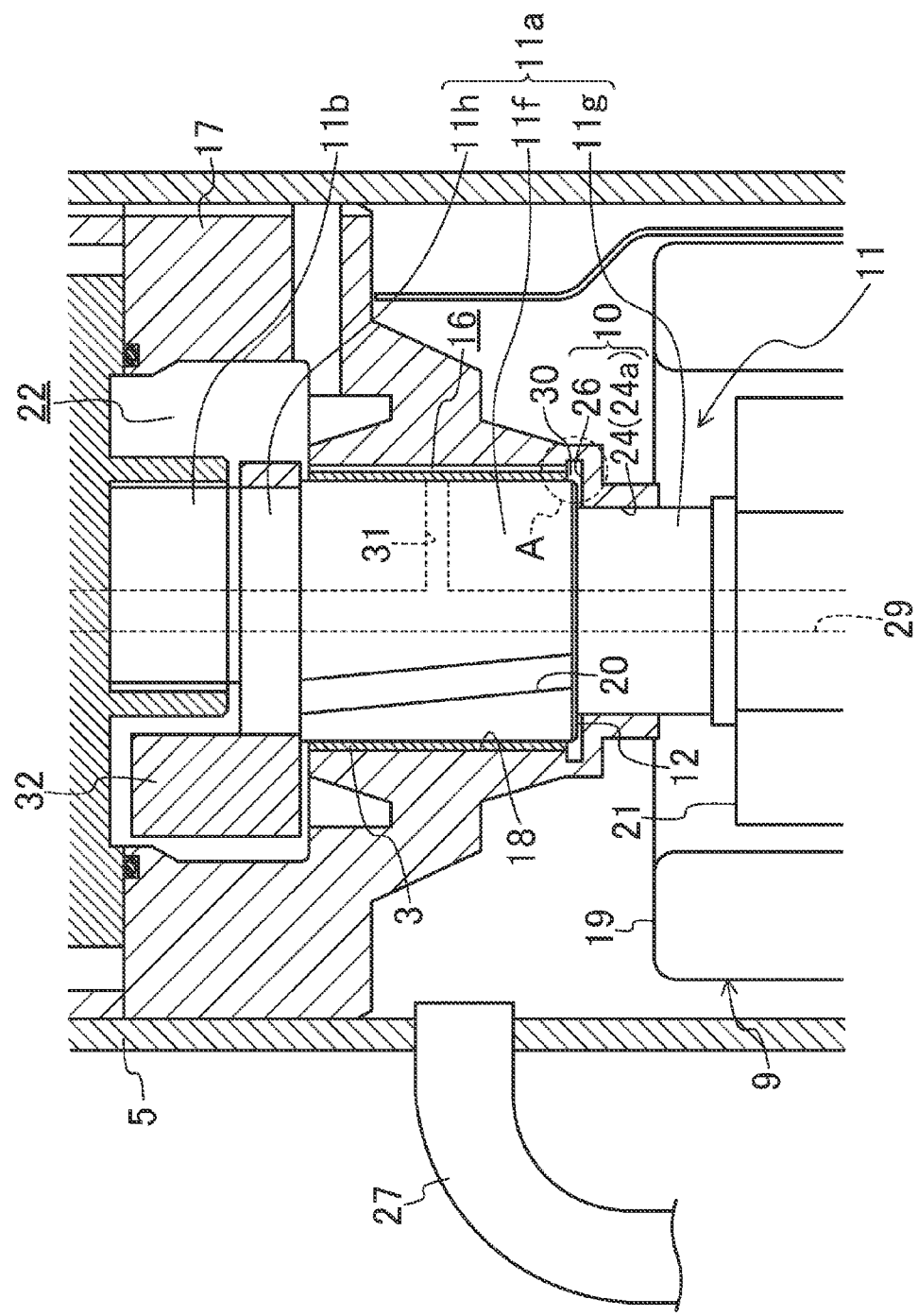
FIG. 2 is an enlarged longitudinal sectional view illustrating the periphery of an upper bearing.
Figure 3:
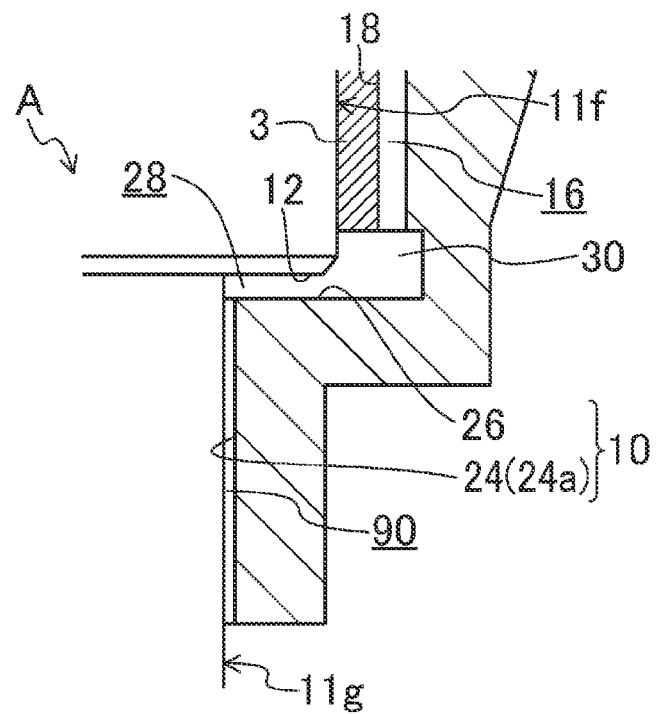
FIG. 3 is an enlarged longitudinal sectional view illustrating details of a section indicated by "A" in FIG. 2.
Figure 5:
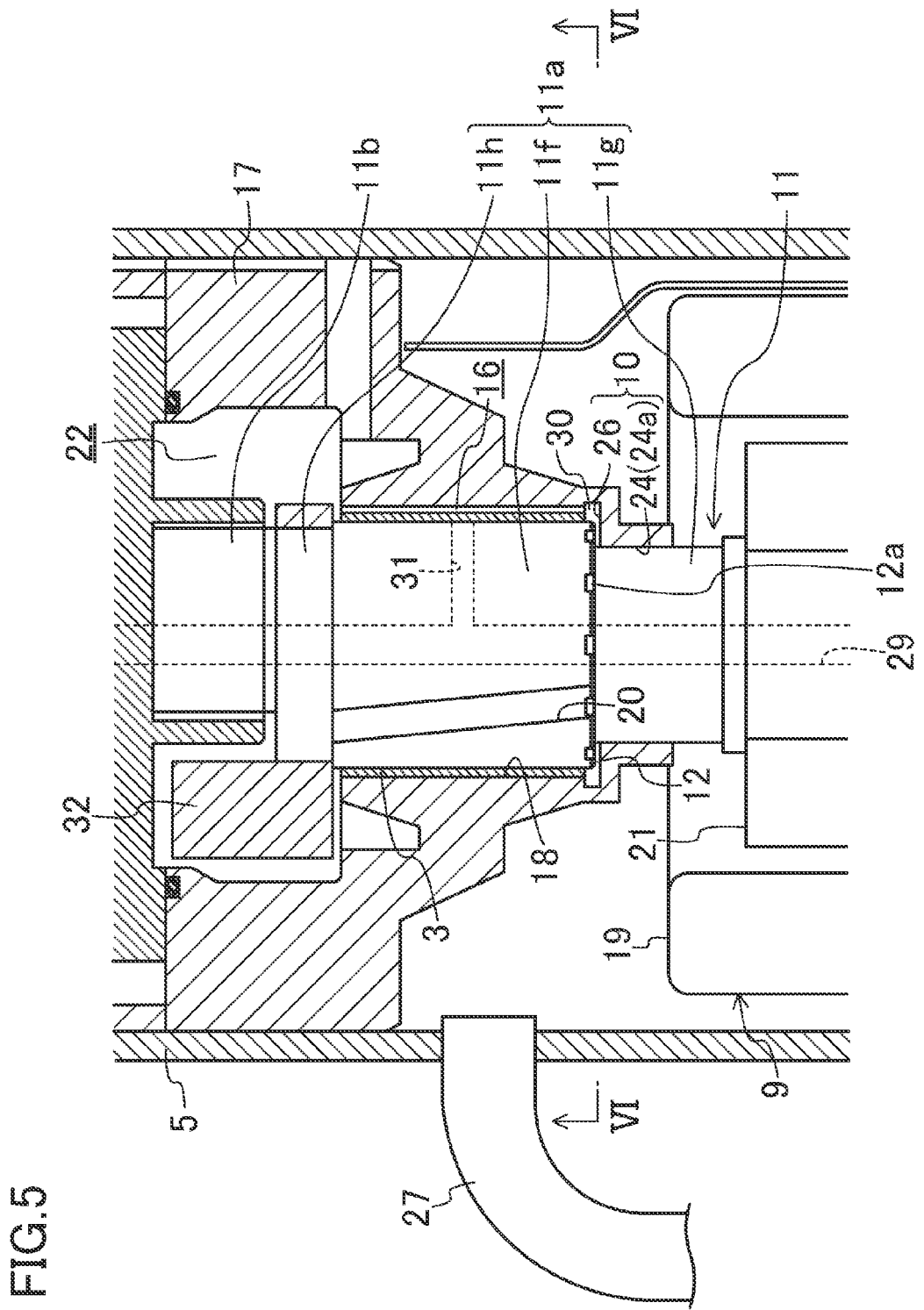
FIG. 5 is a view illustrating a variation of the embodiment and corresponding to FIG. 2.
Figure 6:
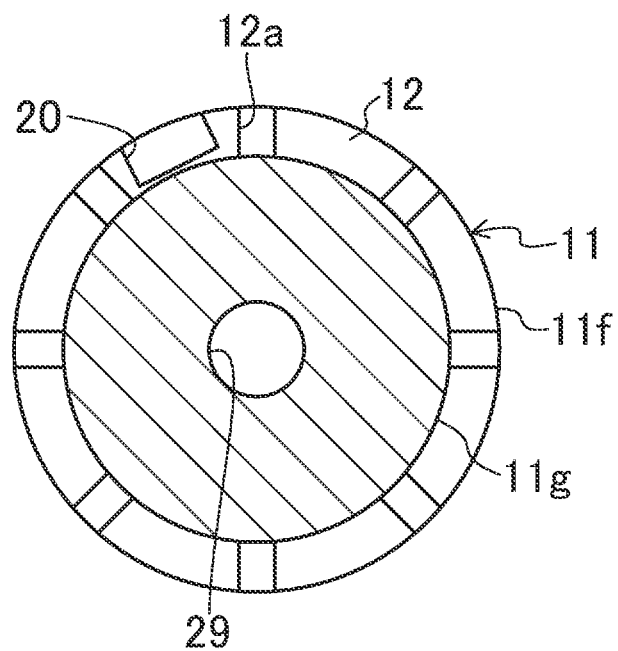
FIG. 6 is a cross-sectional view along a VI-VI line illustrated in FIG. 5

FIGS. 5 and 6 illustrate a variation of the foregoing embodiment, and the configuration of the stepped surface (12) of the drive shaft (11) as illustrated in FIGS. 5 and 6 is different from that of the foregoing embodiment. Note that the same reference numerals as those shown in FIG. 2 are used to represent substantially equivalent elements in the present variation, and the description thereof will not be repeated.

That is, in the present variation, a plurality of slit-shaped grooves (12a) (e.g., eight slit-shaped grooves (12a) in the present variation) extending toward the outside in the radial direction are formed at the stepped surface (12) of the drive shaft (11). Each slit-shaped groove (12a) is formed so as to extend from an inner circumferential edge to an outer circumferential edge of the stepped surface (12) in the radial direction, and opens, at an outer circumferential side thereof, to the outside in the radial direction. Each slit-shaped groove (12a) linearly extends from the inside to the outside in the radial direction, but may be formed so as to curve in a streamline shape as viewed in the axial direction of the drive shaft (11).

According to the present variation, since the slit-shaped grooves (12a) are formed at the stepped surface (12) of the drive shaft (11), it can be ensured, as compared to the case where no slit-shaped groove (12a) is formed, that rotation centrifugal force of the drive shaft (11) is transmitted to lubrication oil flowing into the clearance space (28) formed between the stepped surface (12) and the oil receiving surface (26). Thus, it can be ensured that the lubrication oil flowing into the clearance space (28) is pushed back toward the outside in the radial direction by the centrifugal force and is discharged to the circular groove (30). Consequently, in the present variation, it can be further ensured that features and advantages similar to those of the foregoing embodiment are realized.

Other Embodiments

The configuration of the present disclosure is not limited to the foregoing embodiments, and includes various configurations other than the foregoing.

That is, in each of the foregoing embodiments, the example where the scroll compressor (1) is employed as the compressor has been described. However, the present disclosure is not limited to such an example, and, e.g., a centrifugal compressor or an axial compressor may be employed.

In each of the foregoing embodiments, the plain bearing is employed as each bearing (3, 35). However, the present disclosure is not limited to the plain bearing, and, e.g., a rolling bearing may be employed.

In each of the foregoing embodiments, the circular groove (30) is formed at the circumferential wall surface of the housing (17) below the bearing hole (18), but the circular groove (30) is not necessarily formed.

In each of the foregoing embodiments, the structure for reducing or preventing oil leakage is employed for the upper bearing (3). However, the present disclosure is not limited to such a configuration, and the structure for reducing or preventing oil leakage may be employed for, e.g., the lower bearing (35).

In each of the foregoing embodiments, the sealing part (10) includes the oil receiving surface (26) and the circumferential wall surface (24a) defining the seal hole (24), but the sealing part (10) does not necessarily include the circumferential wall surface (24a) defining the seal hole (24). That is, as long as the sealing part (10) includes the oil receiving surface (26), any configurations may be employed for the sealing part (10).

In each of the foregoing embodiments, the sealing part (10) is provided in the housing (17). However, the present disclosure is not limited to such a configuration, and the sealing part (10) may be provided in, e.g., a member other than the housing (17).

INDUSTRIAL APPLICABILITY

The present disclosure is useful for a compressor including a compression mechanism configured to compress fluid by rotational movement, a rotary drive shaft configured to drive the compression mechanism, a bearing through which the rotary drive shaft penetrates, and an oil supply passage formed in the rotary drive shaft to supply lubrication oil to a clearance between the rotary drive shaft and the bearing. In particular, the present disclosure is useful for a compressor in which an outlet pipe is connected to a motor housing space formed below a bearing.

DESCRIPTION OF REFERENCE CHARACTERS

3 Bearing
5 Casing
7 Scroll Mechanism (Compression Mechanism)
10 Sealing Part
11 Drive Shaft
11f Large-Diameter Shaft Part
11g Small-Diameter Shaft Part
12 Stepped Surface
12a Slit-Shaped Groove
16 First Oil Return Groove
17 Housing (Bearing Housing)
18 Bearing Hole (Insertion Hole)
20 Second Oil Return Groove
22 Recessed Space (Predetermined Space)
24a Cylindrical Sealing Surface Sealing Part)
26 Oil Receiving Surface (Sealing Part)
28 Clearance Space
29 Oil Supply Passage

What is claimed is:

1. A compressor comprising:
   a casing;
   a compression mechanism housed in the casing and configured to compress fluid by rotational movement;
   a rotary drive shaft housed in the casing and connected to the compression mechanism at an upper end part of the rotary drive shaft;
   a bearing with the rotary drive shaft penetrating therethrough;
   an oil supply passage formed in the rotary drive shaft to supply lubrication oil to a clearance between the rotary drive shaft and the bearing;
   a sealing part configured to reduce or prevent downward oil leakage from the bearing; and
   a bearing housing formed with an insertion hole, the bearing being inserted in the insertion hole and the bearing housing being fixed to the casing,
   the rotary drive shaft including
      a large-diameter shaft part supported by the bearing, and
      a small-diameter shaft part connected to a lower end part of the large-diameter shaft part so as to be coaxial with the large-diameter shaft part,
   the sealing part including an oil receiving surface formed in the bearing housing so as to face a stepped surface formed at a boundary between the large-diameter shaft part and the small-diameter shaft part with a clearance being formed between the oil receiving surface and the stepped surface so as to surround an outer periphery of the small-diameter shaft part,
   the sealing part being formed with
      a clearance space between the stepped surface and the oil receiving surface, and
      a circular groove surrounding an outer periphery of the clearance space,
   the bearing housing having an inner circumferential surface defining the insertion hole with a first oil return groove formed at the inner circumferential surface, the first oil return groove
      communicating, at one end thereof, with the circular groove,
      communicating, at the other end thereof, with a predetermined space inside the casing,
      disposed outside the bearing in a radial direction relative to the rotary drive shaft, and
      configured to allow the lubrication oil on which centrifugal force of the rotary drive shaft acts in the clearance space to flow through the first oil returning groove.

2. The compressor of claim 1, wherein
a slit-shaped groove extending from an inside of the rotary drive shaft to an outside of the rotary drive shaft in the radial direction is formed at the stepped surface of the rotary drive shaft.

3. The compressor of claim 2, wherein
a second oil return groove is formed at an outer circumferential surface of the large-diameter shaft part, the second oil return groove
   communicating, at one end thereof with the clearance space between the stepped surface and the oil receiving surface and
   communicating, at the other end thereof, with the predetermined space inside the casing.

4. The compressor of claim 3, wherein
the second oil return groove extends from a lower end to an upper end of the large-diameter shaft part so as to be inclined toward a rear side in a rotation direction of the rotary drive shaft.

5. The compressor of claim 4, wherein
the sealing part further includes a cylindrical sealing surface extending downward from an inner circumferential edge of the oil receiving surface.

6. The compressor of claim 5, wherein
a distance between an outer circumferential surface of the small-diameter shaft part and the cylindrical sealing surface is equal to or longer than a distance between the outer circumferential surface of the large-diameter shaft part and an inner circumferential surface of the bearing.

7. The compressor of claim 3, wherein
the sealing part further includes a cylindrical sealing surface extending downward from an inner circumferential edge of the oil receiving surface.

8. The compressor of claim 7, wherein
a distance between an outer circumferential surface of the small-diameter shaft part and the cylindrical sealing surface is equal to or longer than a distance between the outer circumferential surface of the large-diameter shaft part and an inner circumferential surface of the bearing.

9. The compressor of claim 2, wherein
the sealing part further includes a cylindrical sealing surface extending downward from an inner circumferential edge of the oil receiving surface.

10. The compressor of claim 9, wherein
a distance between an outer circumferential surface of the small-diameter shaft part and the cylindrical sealing surface is equal to or longer than a distance between the outer circumferential surface of the large-diameter shaft part and an inner circumferential surface of the bearing.

11. The compressor of claim 1, wherein
a second oil return groove is formed at an outer circumferential surface of the large-diameter shaft part, the second oil return groove
    communicating, at one end thereof, with the clearance space between the stepped surface and the oil receiving surface and
    communicating, at the other end thereof, with the predetermined space inside the casing.

12. The compressor of claim 11, wherein
the second oil return groove extends from a lower end to an upper end of the large-diameter shaft part so as to be inclined toward a rear side in a rotation direction of the rotary drive shaft.

13. The compressor of claim 12, wherein
the sealing part further includes a cylindrical sealing surface extending downward from an inner circumferential edge of the oil receiving surface.

14. The compressor of claim 13, wherein
a distance between an outer circumferential surface of the small-diameter shaft part and the cylindrical sealing surface is equal to or longer than a distance between the outer circumferential surface of the large-diameter shaft part and an inner circumferential surface of the bearing.

15. The compressor of claim 11, wherein
the sealing part further includes a cylindrical sealing surface extending downward from an inner circumferential edge of the oil receiving surface.

16. The compressor of claim 15, wherein
a distance between an outer circumferential surface of the small-diameter shaft part and the cylindrical sealing surface is equal to or longer than a distance between the outer circumferential surface of the large-diameter shaft part and an inner circumferential surface of the bearing.

17. The compressor of claim 1, wherein
the sealing part further includes a cylindrical sealing surface extending downward from an inner circumferential edge of the oil receiving surface.

18. The compressor of claim 17, wherein
a distance between an outer circumferential surface of the small-diameter shaft part and the cylindrical sealing surface is equal to or longer than a distance between the outer circumferential surface of the large-diameter shaft part and an inner circumferential surface of the bearing.

* * * * *